(12) United States Patent
Zinser et al.

(10) Patent No.: US 6,309,293 B1
(45) Date of Patent: Oct. 30, 2001

(54) METHOD AND VACUUM FILLER FOR FILLING A PASTY FILLING MATERIAL

(75) Inventors: Georg Zinser, Winterstettenstadt; Georg Pick, Biberach, both of (DE)

(73) Assignee: Albert Handtmann Maschinenfabrik, Biberach (DE)

( * ) Notice: Subject to any disclaimer, the term of this patent is extended or adjusted under 35 U.S.C. 154(b) by 0 days.

(21) Appl. No.: 09/531,042

(22) Filed: Mar. 20, 2000

(51) Int. Cl.[7] .................................................. A22C 11/08
(52) U.S. Cl. .................................................. 452/41; 452/40
(58) Field of Search .......................................... 452/41, 40

(56) References Cited

U.S. PATENT DOCUMENTS

| | | | |
|---|---|---|---|
| 2,837,762 | * | 6/1958 | Azzini et al. ........................ 452/41 |
| 3,631,565 | * | 1/1972 | Muller .................................. 452/41 |
| 3,742,556 | * | 7/1973 | Beasley ............................... 452/41 |
| 4,484,374 | * | 11/1984 | Herschberger ..................... 452/41 |
| 4,975,033 | * | 12/1990 | Righele et al. ..................... 452/41 |
| 5,102,314 | * | 4/1992 | Staudenrausch ................... 452/41 |
| 5,380,240 | * | 1/1995 | Staudenrausch ................... 452/41 |
| 5,720,603 | * | 2/1998 | Miller et al. ........................ 452/41 |

FOREIGN PATENT DOCUMENTS

| | | |
|---|---|---|
| 4227621 | 2/1994 | (DE) . |
| 432388 | 6/1991 | (EP) . |

* cited by examiner

Primary Examiner—Willis Little
(74) Attorney, Agent, or Firm—Marshall, Gerstein, & Borun

(57) ABSTRACT

A method and a vacuum filler for filling a pasty filling material, in particular sausage meat, with the sausage meat being filled into a vane-type conveying mechanism by means of rotatably supported vane cells and a negative pressure being produced in a region of the vane-type conveying mechanism for supporting the intake of sausage meat into the vane-type conveying mechanism. The production of negative pressure is efficient in that it is substantially produced while the vane cells are rotating, which is made possible by installing a closure element for the at least partial opening and closing of a vacuum opening in the housing of the conveying mechanism.

12 Claims, 4 Drawing Sheets

METHOD AND VACUUM FILLER FOR FILLING A PASTY FILLING MATERIAL

FIELD OF THE INVENTION

The present invention relates to a method for filling a pasty filling material and to a vacuum filler for filling a pasty filling material.

BACKGROUND OF THE INVENTION

Vacuum fillers are known that are used for conveying sausage meat and comprise a vane-type conveying mechanism as a metering or proportioning unit. Such a vacuum filler is e.g. described in European patent specification EP 0 432 388 B2. A further embodiment of a vane-type conveying mechanism for use in a vacuum filler is e.g. disclosed in German patent application DE 42 27 621 A1.

In such vacuum fillers, the filling material to be conveyed in the vane-type conveying mechanism can only be evacuated through gaps at places at which the vanes of the conveying mechanism, the rotor and the housing of the conveying mechanism are in contact. Such gaps should only be so large that filling material cannot be passed therethrough, in particular when the conveying mechanism is at a standstill in the activated state of the vacuum pump as, otherwise, said filling material would be sucked into the vacuum channel and would then clog said channel. However, the width of the gap which is to be kept small renders the evacuating process difficult because the suction effect is thereby restricted or limited.

SUMMARY OF THE INVENTION

It is therefore the object of the present invention to provide a method and a vacuum filler for permitting a more efficient production of negative pressure for supporting the intake of sausage meat.

Since the negative pressure in the vane-type conveying mechanism is in the main only produced while the vane cells are rotating and, consequently, in a state where the rotor is not at a standstill, the negative pressure will only be produced when the sausage meat is filled into the vane cells and further transported in portions to the outlet of the vane-type conveying mechanism by rotation of the vane cells. The mechanical transportation of the sausage meat will prevent the sausage meat from being drawn into the vacuum channel.

However, since there is no negative pressure for the period of time in which the operation is interrupted, i.e. in the stopped state of the vane-type conveying mechanism, the efficient cross-sections of the gaps can be made larger than in the prior art. The gap size is only restricted to a dimension which ensures that in the running state of the conveying mechanism no sausage meat is pressed or sucked into the vacuum channel. Therefore, the gap may have a larger size or greater depth than in vacuum fillers according to the prior art, which will then effect the desired and more efficient production of a negative pressure.

Preferably, the rearward suction effected by the negative pressure is in a direction opposite to the rotational direction of the vane cells. As a result, sausage meat possibly passing into the area of negative pressure is conveyed in the running state of the conveying mechanism out of said mechanism and away from the opening of the suction channel towards the sausage meat outlet, whereby sausage meat material is prevented from being sucked into the vacuum channel.

The negative pressure is particularly preferably produced in delayed fashion after the conveying mechanism has been switched on, in particular only if a first vane cell has already moved past the vacuum opening. In such a case, the sausage meat which has possibly accumulated near the vacuum opening is pushed away by the vane cell moving past the vacuum opening, so that the sausage meat cannot pass into the vacuum channel by reason of the resulting vacuum.

In an advantageous development of the method, the negative pressure is automatically produced in rotating vane cells. Since the operating personnel need not worry about the production and deactivation of negative pressure while the conveying mechanism is rotating or at a standstill, the vacuum filler can be handled in an easy manner.

A vacuum filler according to the invention is characterized in that it comprises a closure element for at least partly opening and closing the vacuum opening, i.e. a unit which either allows or blocks the conduction of the negative pressure prevailing in the vacuum channel into the area of the conveying mechanism. Since, in contrast to the prior art, the vacuum opening towards the conveying mechanism does not have a constant cross-section, but the cross section of said opening can also be reduced by a closure element or the vacuum opening may be closed altogether by such a closure element, it is possible that the negative pressure in the conveying mechanism is only producible in the main while the vane cells are rotating, resulting in the already above-described advantages.

The closure element is preferably arranged in the transitional region extending from the vacuum channel to the inner chamber of the housing of the conveying mechanism. In this area, the closure element can efficiently separate the conveying mechanism from the entire vacuum channel.

Advantageously, the vacuum opening is arranged in an upper region of the wall of the vane-type conveying mechanism. Since sausage meat predominantly collects on the bottom, i.e. in a lower region of a vane cell, the provision of the vacuum opening in an upper region at a distance from said lower region will render difficult or prevent the entry of sausage meat into the vacuum opening communicating with a vacuum source or into the vacuum channel.

In an advantageous embodiment the closure element is mounted and designed with its surface oriented towards the interior of the housing of the conveying mechanism in such a manner that the vanes of the vane cells sweep along said surface while the vane cells are rotating. Hence, the side of the closure element that is oriented towards the interior of the housing of the conveying mechanism is designed as part of the outer contour of the vane-type conveying mechanism swept over by the vanes, with the effect that the vanes will continuously wipe off sausage meat possibly adhering to said place, so that a cleaning effect is achieved and the formation of long-time deposits on the closure element is avoided.

Preferably, the closure element is designed as a slide because the closure element can then be realized mechanically in an easy manner and the vacuum opening of the vacuum channel can be closed and opened again easily by displacing the slide.

Preferably, the slide is detachably arranged on a spring bar supported in the wall of the housing of the conveying mechanism. The spring bar is expediently shaped such that it does not substantially block the vacuum opening. In the operative position it can movably be supported with one end in the wall of the housing of the conveying mechanism and can be connected with the other end to the actuator for the slide. The spring bar will move and then hold the slide in its opening and closing positions; on the other hand, the spring bar permits an easy disassembly for cleaning the slide as the spring bar can be moved into a position in which it is no longer supported in the housing of the conveying mechanism and can then be bent rearwards for releasing the slide.

The closure element, e.g. the slide, can be displaced by an operator manually for closing or opening the vacuum opening; preferably, however, the closure element is connected to an electromotive actuator to permit an automatic slide control that is coupled with the activation and deactivation of the conveying mechanism. Alternatively, a pneumatic cylinder may be used as the actuator.

BRIEF DESCRIPTION OF THE DRAWINGS

The electromotive actuator is connected to the machine control so that it can be controlled in response to the operative state of the rotor, i.e. when the vane-type conveying mechanism is operated and when the vane cells receive the sausage meat material to be portioned and when they convey the material to the sausage meat outlet, the vacuum opening can automatically be opened by activating the electromotive actuator (optionally with a time delay) and can be closed again after the conveying mechanism has been deactivated.

The present invention will now be explained in more detail with reference to the drawings, in which.

DETAILED DESCRIPTION OF THE PREFERRED EMBODIMENT

First of all, some of the features shared by a known vacuum filler and a vacuum filler according to the invention shall be described in more detail with reference to FIGS. 1 and 2.

Figure 1:
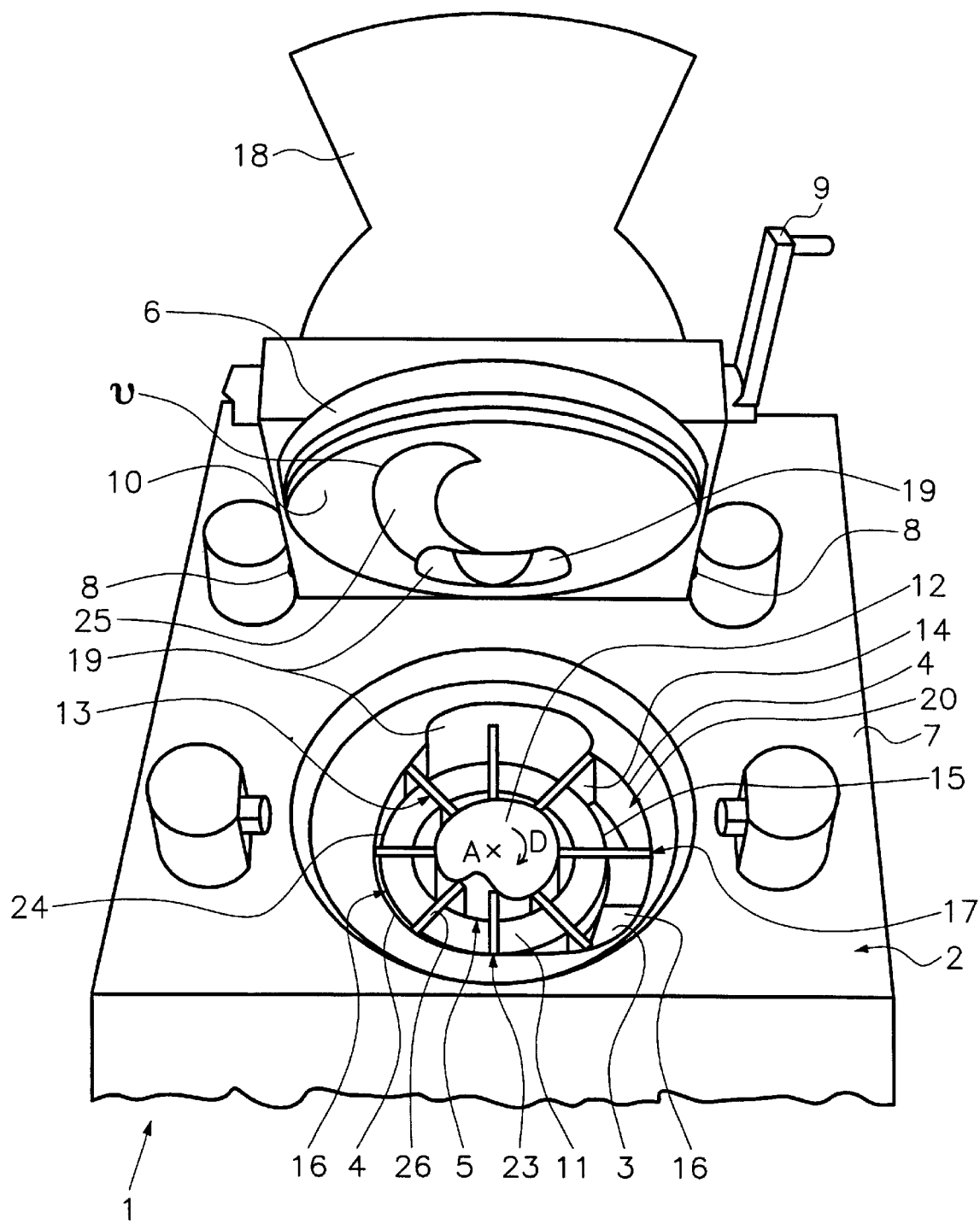
FIG. 1 is a perspective inclined view from the top onto a known vane-type conveying mechanism with opened lid.

The vane-type conveying mechanism which in FIG. 1 is designated by 1 on the whole comprises a housing 2 with an inner chamber 5 which is defined by a bottom plate 3 and a lateral inner wall 4 of the housing and can be closed upwards with a lid 6. In the position illustrated in FIG. 1, the lid 6 is shown in its unfolded state for cleaning purposes or the like, so that the inner chamber 5 of the housing 2 of the conveying mechanism can be seen.

For closing purposes the lid which is pivotable about a rotational axis or shaft 8 mounted on the upper side 7 of the housing can be pivoted by means of a lever 9 into the operative position in which the conveying mechanism I is closed and in which the lower lid plate 10 defines the inner chamber 5 of the conveying mechanism 1 upwardly.

In the inner chamber 5 of the conveying mechanism 1, a rotor 11 is eccentrically supported around an eccentric 12. The rotor 11 can be rotated by a drive shaft (not shown) which is supported in housing 2. Radial slots 13 in which the vanes 14 are supported in a radially displaceable manner are incorporated into the annularly shaped rotor 11. The vanes 14 form vane cells 16 together with the inner wall 4, the bottom 3, the lid plate 10 and the outer surface 15 of the rotor 11.

During their rotational movement the outsides 17 of the vanes 14 sweep along the inner wall 4 of the housing 2. The volume of the vane cells 16, which act as conveying cells, is here changed when viewed in the rotational direction D of the rotor 11. These changes in volume are defined by the contour of the inner wall 4.

The upper side of the lid has seated thereon the inlet funnel 18 whose lower end forms the sausage meat inlet 19 for filling the sausage meat to be portioned into the vane cells 16 positioned thereon. When viewed in the rotational direction D, the sausage meat inlet 19 is followed by a pressure region 20 in which the vane cells 16 are decreasing in volume. The pressure region 20 terminates in a sausage meat outlet 21 shown in FIG. 2, which leads to an outlet pipe 22 connected to a twist-off device (not shown).

The sausage meat outlet 21 is followed, again when viewed in the rotational direction D, by a sealing portion 23 in which the outer surface 15 of the rotor 11 comes into direct contact with the inner wall 4 of the housing 2.

The sealing portion 23 is followed by the vacuum region 24 which extends up to the sausage meat inlet 19. A negative pressure which facilitates the filling of the sausage meat is produced in said vacuum region 24. To this end the lid 6 is provided at the side facing the inner chamber 5 of the conveying meachism with a deepened groove surface 25 the contour of which is also outlined in FIG. 2 by the dash-dotted line in the operative position. In the closed state of the lid 9 the groove surface 25 covers the vane cells 16 in the vacuum region 24, leaving a gap between the bottom side 10 of the lid and the upper vane side 26, the size of the gap substantially corresponding to the depth of the groove. While the vane cells 16 that are positioned between sausage meat inlet 19 and sausage meat outlet 21 are substantially sealed, a free connection for producing a negative pressure which can be produced by elements generally designated as vacuum device 27 is thus established by said gap 25 between the individual vane cells 16 in the vacuum region 24.

Figure 2:
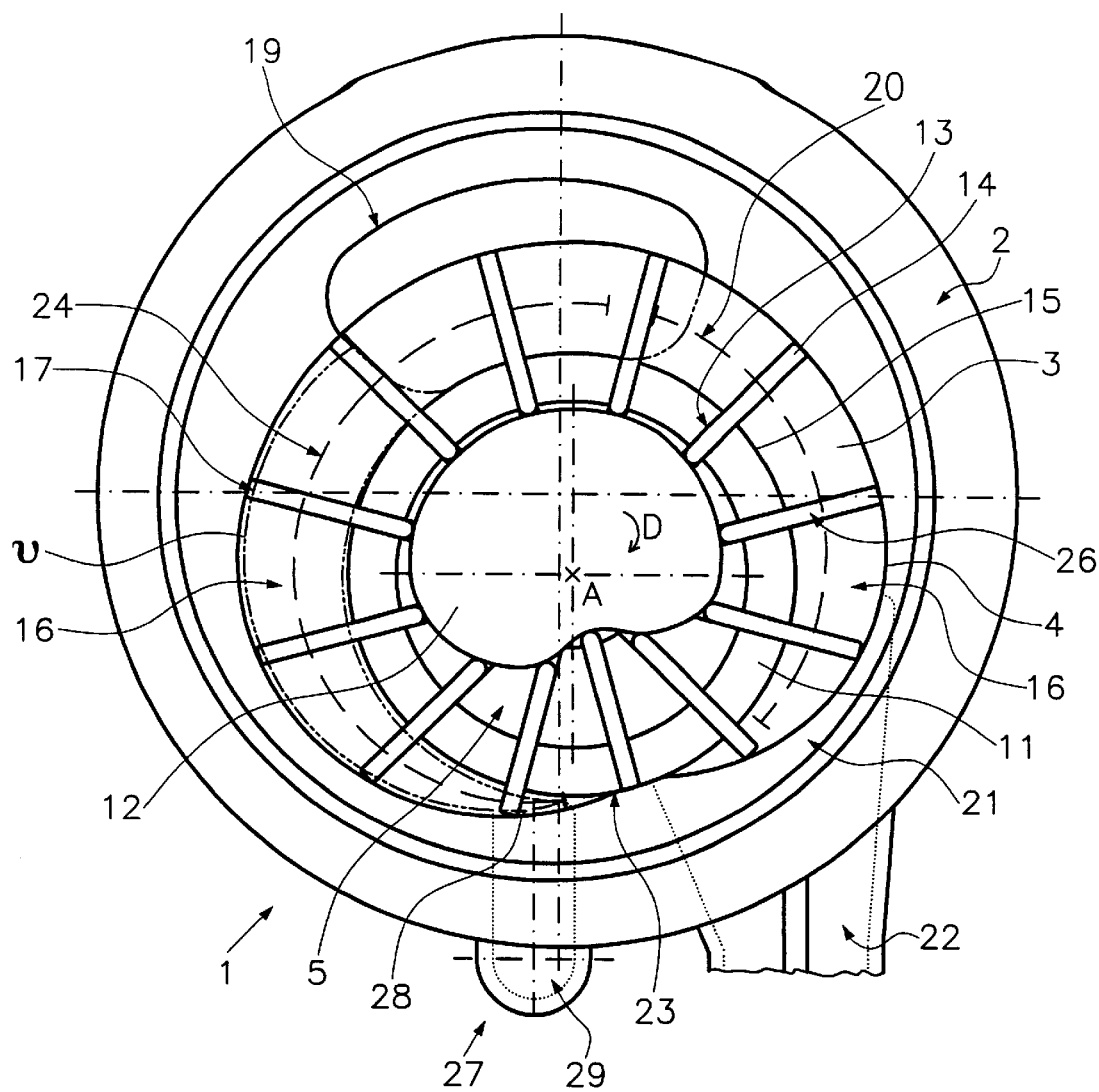
FIG. 2 is a schematic top view onto the known vane-type conveying mechanism according to FIG. 1 with removed lid.
Figure 3:
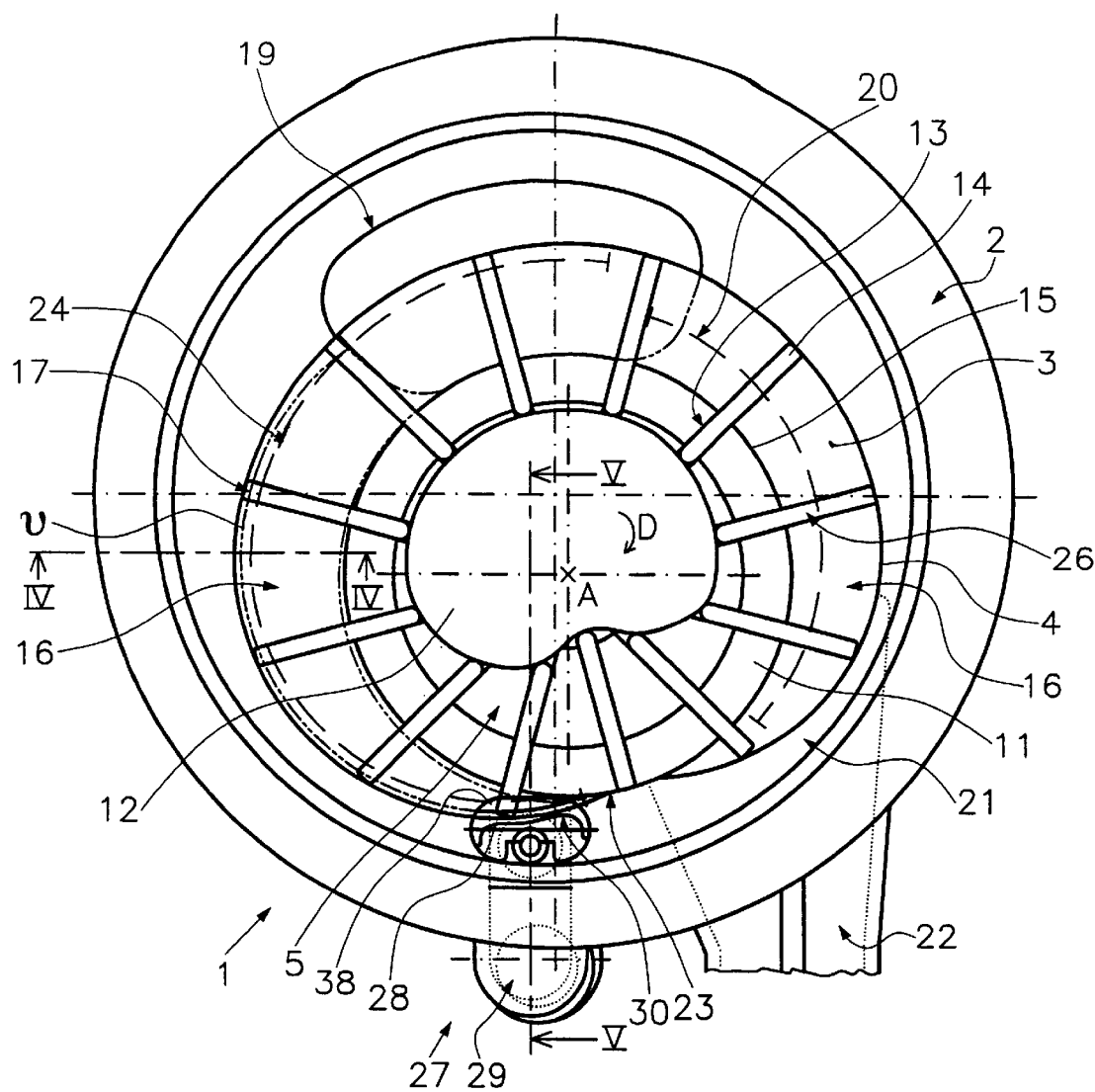
FIG. 3 is a schematic top view onto a vane-type conveying mechanism of a vacuum filler according to the invention with removed lid.
Figure 4:
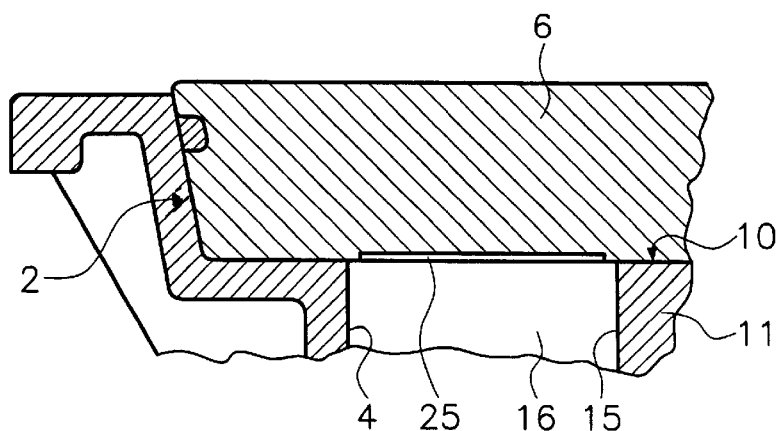
FIG. 4 is a partial section taken along line IV—IV in FIG. 3.

As can be seen in FIG. 2, said elements of the vacuum device 27 comprise a vacuum opening 28 which is formed at the beginning of the vacuum region 24 laterally in the inner wall 4 of the housing and terminates in the interior of a vane cell 16 and which is connected via a vacuum channel 29 to a vacuum source (not shown).

When the sausage meat inlet 19 which is connected to the inlet funnel 18 is tightly filled with sausage meat, a negative pressure can be produced with the vacuum device 27 in the vacuum region 24 of the vane-type conveying mechanism 1 between vacuum opening 28 and inlet 19, said negative pressure permitting a vacuum-supported intake of the sausage meat into the vane cells 16 and simultaneously withdrawing air from the filling material.

However, in contrast to a device according to the invention, the vacuum opening 28 in a known conveying mechanism has a constant unvariable cross-section of the opening, i.e. one that cannot be closed (not even in part).

Since during operation of said known vacuum filler the vacuum pump is in a permanently activated state and since, as a result, the vacuum opening 28 permanently produces a negative pressure, i.e. also in the inoperative state of the conveying mechanism 1, in the vacuum region 24 communicating with the inlet 19, the groove depth of the groove surface 25 in the lid 6 should only be so large in the known vacuum fillers that no filling material can be drawn into the vacuum channel 29, if possible also in cases where the conveying mechanism 1 is at a standstill. As a consequence, however, the effective cross-section which is available for vacuum generation is considerably limited and an efficient evacuation of the filling material to be conveyed is thus rendered difficult.

The vane-type conveying mechanism of a vacuum filler of the invention as is shown in FIGS. 3 to 6 no longer exhibits such a drawback, as shall be explained in further detail in the following. Functionally identical components are designated with the same reference numerals as in FIGS. 1 and 2.

In contrast to the prior art, the conveying mechanism 1 of the invention comprises a closing unit which is directly arranged in the transitional region between vacuum channel 29 and inner chamber 5 of the housing 2 of the conveying mechanism, in the specific embodiment the slide 30 by which the vacuum opening 28 can be closed and can be reopened again at least in part. The vacuum opening 28 has e.g. a square cross-section.

Figure 5:
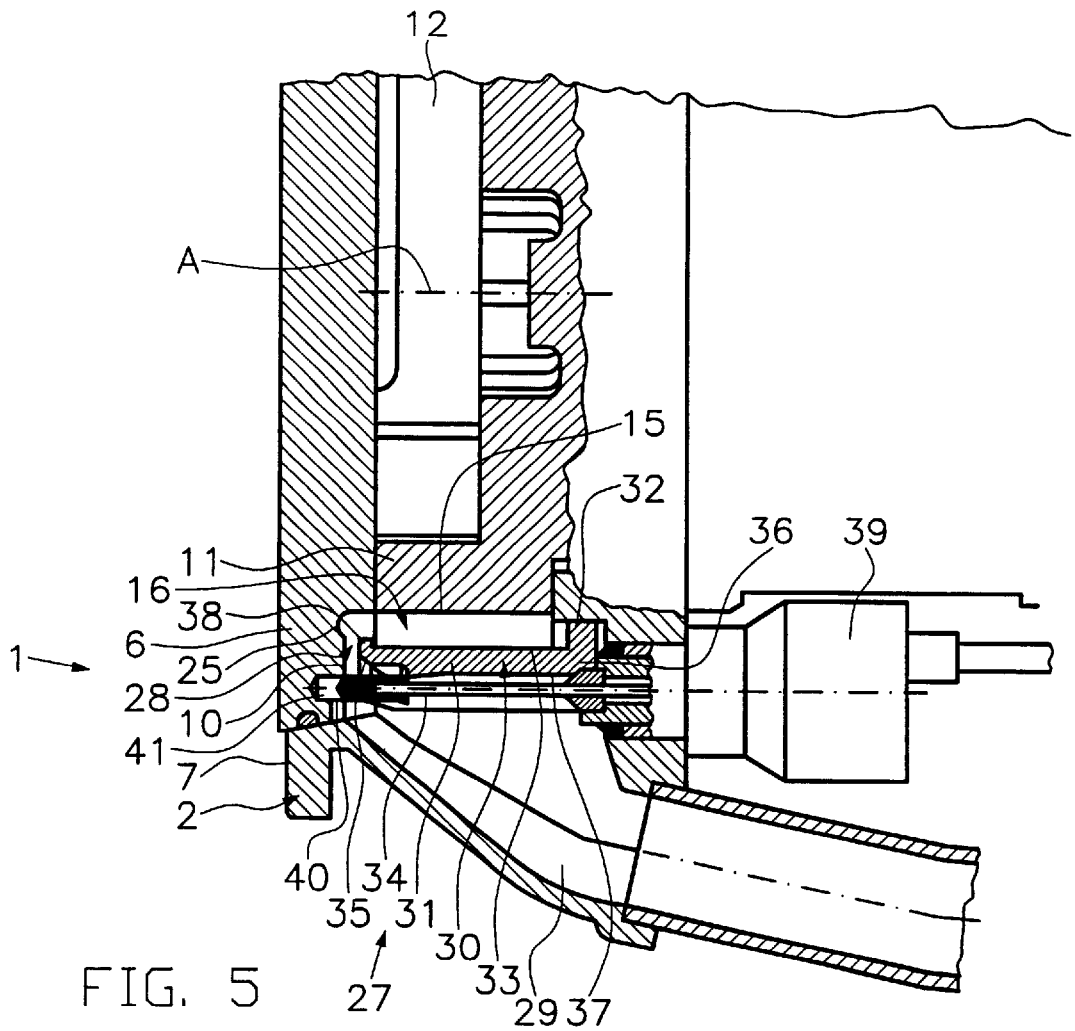
FIG. 5 is a cross section taken along line V—V in FIG. 3, in which the vacuum opening is opened.
Figure 6:
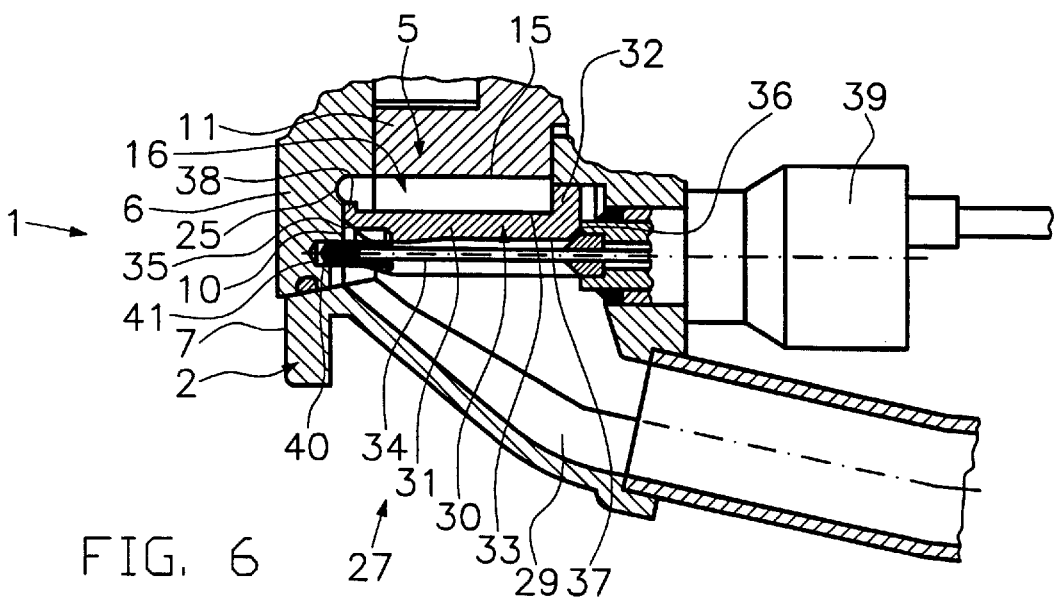
FIG. 6 is a cross section taken along line V—V in FIG. 3, in which the vacuum opening is closed.

As shown in particular in the section according to FIGS. 5 and 6, the slide 30 is arranged in parallel with the axis A of the vane-type conveying mechanism 1 and has a substantially L-shaped cross-section with two legs 31, 32. The slide 30 is arranged in the housing 2 in such a fashion that the surface 33 of its first leg 31 which extends in the direction of axis A and is oriented towards the inner chamber 5 of the housing 2 of the conveying mechanism is substantially flush with the lateral inner wall 4 of the housing.

Said surface 33 of the slide 30 is shaped such that during operation the rotating vanes 14 of the vane cells 16 sweep along said surface 33. The size of the surface 33 oriented towards the interior of the housing 2 of the conveying mechanism is chosen such that the slide 30 in the state shown in FIG. 6 can completely close the vacuum opening 28.

The slide 30 is held with a spring bar 34 which is supported in the wall of the housing 2 of the conveying mechanism and which also extends in a direction parallel to the axis A of the vane-type conveying mechanism 1. The elongated spring bar 34 is here so small that it does not substantially block the vacuum opening 28 or the vacuum channel 29 with its portion projecting beyond the slide at the top. It comprises two clamping surfaces 35 and 36 between which the slide 30 is brought into contact with its sides 37 facing away from the inner chamber 5 of the housing.

A sealing surface 38 which laterally projects beyond the first clamping surface 35 and which in the closed state of the vacuum opening 28 rests on the bottom side 10 of the lid 6 is mounted at the upper end of the clamped slide 30.

The lower end of the spring bar 34 which faces away from the lid 6 of the vane cell housing 2 is connected to an electromotive actuator 39 which can move the spring bar 34 and the slide 30 supported thereon in parallel with the axis A of the vane-type conveying mechanism 1.

The electromotive actuator 39 is connected to an automatic control unit (not shown) which actuates the actuator 39 in response to the operative state of the rotor 11.

The end 40 of the spring bar 34 which faces the lid 6 is supported in the operative position in a hole 41 on the inside 10 of the lid 6. The length of the spring bar 34 and the depth of the hole 41 are chosen such that the end 40 of the spring bar 34 is positioned within the hole 41 in the (at least partly) open and also in the completely closed vacuum opening 28.

For cleaning purposes the slide can be disassembled easily. To this end the lid 6 is swung out of its operative position and the spring bar 34 can then be bent rearwards, possibly after removal of the connection piece forming the beginning of the vacuum channel 29, and the vacuum slide 30 can be removed from the bar rod 34 for cleaning or repair purposes.

The vacuum filler according to the invention can now be operated as follows for performing the method according to the invention.

First of all, the batch to be filled, i.e. a specific amount of sausage meat, is filled into the funnel 18 in the closed state of lid 6. During this operation the machine may still be in its deactivated state or may already be in its activated state; in both cases, however, the vane-type conveying mechanism is not running yet. Upon activation, however, the vacuum pump will start running and the electronic control unit will assume its basic state. The parameters desired for the subsequent filling process, e.g. the size of the portions, or the like, can then be entered. During this time the slide 30 remains closed, i.e. the negative pressure produced in the vacuum channel 29 in front of the slide 30 does not act on the vane cells 15 so that sausage meat entering at said place can also not be sucked into the vacuum channel 29.

When the filling operation is now to be started, the operator activates a hand switch or a foot switch so that the vane-type conveying mechanism starts running. A signal for opening the slide in slightly time-delayed fashion is then produced. The slight time delay, e.g. by the period of passage of one vane length, has the effect that only two first vanes 14 of a vane cell 16 will first of all move past the slide 30 still closing the vacuum opening 28, thereby wiping off sausage meat that might adhere to the inside 33 of the slide.

After said start phase the actuator 39 opens the slide 30 so that the vacuum can now become operative in the inner chamber 24 and support the intake of sausage meat.

The rearward suction of air which is effected by the negative pressure is opposite to the rotational direction D of the vane cells 16. The sausage meat entering into the inlet 19 is then portioned by the vane cells 16 while the rotor 11 is running, and is ejected through the outlet 21 on a twist-off device.

When work is interrupted, the conveying mechanism is stopped. At the same time or directly thereafter, the slide 30 moves again into the closing position, automatically driven by the electromotive actuator (FIG. 6).

Hence, since the negative pressure in the vacuum region 24 of the vane-ype conveying mechanism 1 is only produced while the rotor 11 is rotating, the intake of sausage meat into the vacuum channel 29 is effectively prevented.

The efficient suction cross-sections can thus be greater than in the prior art so that a more efficient vacuum generation is possible.

What is claimed is:

1. A method for filling a pasty filling material, in particular sausage meat, with a vacuum Filler, the sausage meat being filled into a vane-type conveying mechanism (1) by means of rotatably supported vane cells (16), and a negative pressure being produced via a vacuum opening (28) in a region (24) of said vane-conveying mechanism (1) by the vacuum opening (28) that is arranged on the housing of said conveying mechanism communicating with a vacuum channel (29) with a vacuum source for supporting the intake of the sausage meat into said vane-type conveying mechanism (1), comprising the step of producing said negative pressure substantially only in the rotating state of said vane cells (16) by operating a closure element (30) for at least partly opening or closing said vacuum opening (28).

2. The method according to claim 1, and wherein the rearward suction effected by said negative pressure is in a direction opposite to the rotational direction (D) of said vane cells (16).

3. The method according to claim 1 or 2, and wherein said negative pressure is only produced if one of said vane cells (16) has moved past a vacuum opening (28) of said vane-type conveying mechanism (1) for producing said negative pressure.

4. The method according to claim 1 or 2, and wherein said negative pressure is automatically produced while said vane cells (16) are rotating.

5. A vacuum filler for filling a pasty filling material, comprsing in combination a vane-type conveying mechanism (1) for filling a pasty filling material, in particular sausage meat, said conveying mechanism having a housing (2) including a rotor (11) forming vane cells (16), wherein a vacuum opening (28) which communicates through a vacuum channel (29) with a vacuum source is arranged on said housing (2) of said conveying mechanism, and a negative pressure can be produced through said vacuum opening (28) in a region (24) of said vane-type conveying mechanism (1) for supporting the intake of sausage meat into said vane-type conveying mechanism (1), and a closure element (30) for at least partly opening and closing said vacuum opening (28).

6. The vacuum filler according to claim 5, wherein said closure element (30) is arranged in the transitional region extending from said vacuum channel (29) to the inner chamber of said housing (2) of said conveying mechanism.

7. The vacuum filler according to claim 5 or 6, wherein said vacuum opening (28) is arranged in an upper region of the wall (4) of said vane-type conveying mechanism (1).

8. The vacuum filler according to claim 6, wherein said closure element (30) is mounted and designed with its surface (33) directed toward said inner chamber (5) of said housing (2) of said conveying mechanism in such a manner that the vanes (14) of said vane cells (16) sweep along said surface (33).

9. The vacuum filler according to claim 5, wherein said closure element (30) comprises a slide (30).

10. The vacuum filler according to claim 9, wherein said slide 30 is detachably arranged on a spring bar (34) supported in the wall of said housing (2) of said conveying mechanism.

11. The vacuum filler according to claim 5, and wherein an electromotive actuator (39) is connected to said closure element (30).

12. The vacuum filler according to claim 11, and wherein an automatic control unit is connected to said electromotive actuator (39) for controlling said actuator (39) in response to the operative state of said rotor (11).

* * * * *

UNITED STATES PATENT AND TRADEMARK OFFICE
CERTIFICATE OF CORRECTION

PATENT NO. : 6,309,293 B1
DATED : October 30, 2001
INVENTOR(S) : Zinser et al.

It is certified that error appears in the above-identified patent and that said Letters Patent is hereby corrected as shown below:

<u>Title page,</u>
Item [73], the name of the Assignee, which current reads "Albert Handtmann Maschinenfabrik" should instead read -- Albert Handtmann Maschinenfabrik GmbH & Co. KG --.

Signed and Sealed this

Sixteenth Day of July, 2002

*Attest:*

*Attesting Officer*

JAMES E. ROGAN
*Director of the United States Patent and Trademark Office*